United States Patent
Adireddy et al.

(10) Patent No.: US 6,754,294 B1
(45) Date of Patent: Jun. 22, 2004

(54) DUAL EQUALIZER FOR USE IN AN RECEIVER AND METHOD OF OPERATION

(75) Inventors: Srihari Adireddy, Ithaca, NY (US); Lang Tong, Ithaca, NY (US)

(73) Assignee: Cornell Research Foundation, Inc., Ithaca, NY (US)

( * ) Notice: Subject to any disclaimer, the term of this patent is extended or adjusted under 35 U.S.C. 154(b) by 654 days.

(21) Appl. No.: 09/627,453

(22) Filed: Jul. 27, 2000

Related U.S. Application Data

(60) Provisional application No. 60/165,323, filed on Nov. 12, 1999.

(51) Int. Cl.[7] .............................................. H03D 11/04
(52) U.S. Cl. ....................... 375/348; 375/229; 375/230; 375/232; 375/233
(58) Field of Search ................................ 375/229, 230, 375/232, 233, 348, 350

(56) References Cited

U.S. PATENT DOCUMENTS

| | | | |
|---|---|---|---|
| 5,606,464 A | | 2/1997 | Agazzi et al. ................. 360/46 |
| 5,692,011 A | | 11/1997 | Nobakht et al. ............. 375/233 |
| 5,748,674 A | * | 5/1998 | Lim ............................ 375/233 |
| 6,012,161 A | | 1/2000 | Ariyavisitakul et al. ..... 714/795 |
| 6,144,697 A | * | 11/2000 | Gelfand et al. .............. 375/233 |
| 6,185,716 B1 | * | 2/2001 | Riggle ......................... 714/769 |

FOREIGN PATENT DOCUMENTS

| | | |
|---|---|---|
| EP | 0551081 A2 | 7/1993 |
| EP | 0889612 A2 | 1/1999 |

* cited by examiner

Primary Examiner—Shuwang Liu
(74) Attorney, Agent, or Firm—Laurie E. Gathman

(57) ABSTRACT

An apparatus for reducing a precursor ISI signal in a receiver that receives an incoming stream of symbols distorted by intersymbol interference (ISI) includes: 1) a first forward filter for receiving the incoming stream of distorted symbols and generating a first equalized output signal ($Y'_k$); 2) a first decision feedback equalizer (DFE) stage for receiving the $Y'_k$ signal and generating a first decided symbol sequence ($\hat{S}_{k-d}$), wherein the first DFE stage generates from $\hat{S}_{k-d}$ a first postcursor cancellation signal that reduces postcursor ISI in the $Y'_k$ signal and generates from the $Y'_k$ signal a first symbol estimate signal ($v_k$) in which postcursor ISI is at least partially reduced; and 3) a second decision feedback equalizer (DFE) stage for receiving the $Y'_k$ signal and generating a second decided symbol sequence ($\hat{S}_{k-2d}$), wherein the second DFE stage comprises a soft symbol estimator that receives the $v_k$ signal and generates a soft decision sequence ($\hat{S}'_{k-d}$) comprising decided symbols and zero output signals, and wherein the second DFE stage generates from $\hat{S}'_{k-d}$ a precursor cancellation signal that reduces precursor ISI in the $Y'_k$ signal.

21 Claims, 6 Drawing Sheets

DUAL EQUALIZER FOR USE IN AN RECEIVER AND METHOD OF OPERATION

CROSS-REFERENCE TO RELATED APPLICATIONS

This application claims priority under 35 U.S.C. §119(e) to U.S. Provisional Patent Application No. 60/165,323 entitled "Dual Equalizer" filed Nov. 12, 1999.

The present invention is related to those disclosed in the following U. S. patent applications:

1. Ser. No. 09/627,237, filed concurrently herewith, entitled "SYSTEMS AND METHODS FOR PRECURSOR CANCELLATION OF INTERSYMBOL INTERFERENCE IN A RECEIVER";
2. Ser. No. 09/627,191, filed concurrently herewith, entitled "SYSTEMS AND METHODS FOR OPTIMAL SYMBOL SPACING TO MINIMIZE INTERSYMBOL INTERFERENCE IN A RECEIVER"; and
3. Ser. No. 09/627,190, filed concurrently herewith, entitled "SYSTEMS AND METHODS FOR OPTIMAL DISTRIBUTION OF SYMBOLS IN A FIXED SIZE DATA PACKET TO IMPROVE RECEIVER PERFORMANCE".

The above applications are commonly assigned to the assignee of the present invention. The disclosures of these related patent applications are hereby incorporated by reference for all purposes as if fully set forth herein.

TECHNICAL FIELD OF THE INVENTION

The present invention is directed, in general, to wireless and wireline receivers and, more specifically, to a system and method for cancelling precursor intersymbol interference (ISI) in a receiver.

BACKGROUND OF THE INVENTION

The rapid advance of digital technology has created a great demand for, and corresponding advances in, wireless and wireline technology for communicating voice and data traffic. Much of this traffic is carried by the public switched telephone network over fiber optic cable and copper wire. Computers and other data equipment communicate over the Internet and a variety of proprietary local area networks (LANs) and wide area networks (WANs). Increasingly, various types of digital subscriber line (DSL) service or cable modem service are bringing broadband data into homes and offices. Many third generation cellular telephones and wireless PDA devices are also equipped to handle broadband data traffic and Internet capable.

However, even the most modern of wireless and wireline data communication equipment still must contend with the age-old problems inherent in transmitting data through a channel from a transmitter to a receiver. Data is often transmitted as a series of pulses (or symbols) through a wire or the atmosphere. The data symbols may become distorted due to intersymbol interference (ISI), which is an overlap of adjacently transmitted symbols. In a wireless network, ISI may be caused by reflections of the transmitted symbols off natural objects (e.g., tress, hills) and man-made objects (e.g., buildings, brides) in the environment. The reflections cause multiple time-delayed, partially overlapping copies (echoes) of the same signal to arrive at the receiver. ISI also may occur in a non-linear, bandwidth limited channel if the symbol transmission rate is comparable to or exceeds the channel bandwidth, W.

Receivers frequently use a well-known technique, adaptive decision-feedback equalization, to minimize the effects of ISI. An adaptive decision-feedback equalizer (DFE) consists of a feedforward (or forward) filter, a feedback filter, and a decision circuit that decides or detects the value of each symbol in the received signal. The input to the forward filter is the received distorted sequence of data symbols. The input to the feedback filter is the sequence of previously decided (detected) symbols at the output of the decision circuit. The feedback filter removes from the symbol presently being estimated that portion of the ISI that is caused by previously detected symbols.

There are limitations, however, to the performance of decision feedback equalizers. Even under the best of circumstances, a DFE occasionally makes an incorrect decision regarding the value of a received data symbol. The incorrect estimate is then propagated back to the feedback filter, thereby affecting decisions regarding subsequent symbols. Furthermore, a DFE almost always does not perform detection on the first copy of a symbol as it is received. Because of the performance of the channel, symbol reflections may combine in such a way that the peak power of the transmitted symbol occurs after the first echo of the symbol enters the DFE. Thus, some reflections of a symbol (postcursors) are received by the DFE after a symbol is detected, but other reflections of a symbol (precursors) are received by the DFE before the symbol is due to be detected. A conventional DFE is unable to compensate for precursor ISI in the detection of the present symbol because of the causal nature of the feedback filter.

For example, in a sequence of ten symbols, the DFE may be working on detecting (deciding) the fifth symbol. However, precursor ISI from the sixth and seventh symbols and post-cursor ISI of the third and fourth symbols may contribute to distortion of the fifth symbol. Since the third and fourth symbols have already been decided by the decision circuit, the feedback loop can be used to remove the postcursor ISI. However, since the sixth symbol has not been detected yet, the feedback filter does nothing to remove the precursor ISI.

There is therefore a need in the art for improved receivers and transmitters for use in communication networks. In particular, there is a need in the art for improved decision feedback equalizers that have a lower detected symbol error rate. More particularly, there is a need for receivers containing decision feedback equalizers (DFEs) that are capable of at least partially minimizing precursor ISI due to symbols that have not yet been detected. Moreover, there is a need for improved transmitters and A data networks that are capable of maximizing the performance of receivers that contain decision feedback equalizers capable of reducing precursor ISI.

SUMMARY OF THE INVENTION

To address the above-discussed deficiencies of the prior art, it is a primary object of the present invention to provide an apparatus for reducing a precursor ISI signal for use in a receiver capable of receiving from a transmission channel an incoming stream of symbols distorted by intersymbol interference (ISI). In an advantageous embodiment of the present invention, the apparatus comprises: 1) a first forward filter capable of receiving the incoming stream of distorted symbols and generating a first equalized output signal ($Y'_k$); 2) a first decision feedback equalizer (DFE) stage capable of receiving the $Y'_k$ signal and generating a first decided symbol sequence ($\hat{S}_{k-d}$), wherein the first DFE stage generates from $\hat{S}_{k-d}$ a first postcursor cancellation signal capable of reducing postcursor ISI in the $Y'_k$ signal and generates from the $Y'_k$ signal a first symbol estimate signal ($v_k$) in which postcursor ISI is at least partially reduced; and 3) a second decision feedback equalizer (DFE) stage capable of receiving the $Y'_k$ signal and generating a second decided symbol sequence ($\hat{S}_{k-2d}$), wherein the second DFE stage comprises a soft symbol estimator capable of receiving the $v_k$ signal and generating a soft decision sequence ($S'_{k-d}$) comprising decided symbols and zero output signals, and wherein the second DFE stage generates from $S'_{k-d}$ a precursor cancellation signal capable of reducing precursor ISI in the $Y'_k$ signal.

According to one embodiment of the present invention, the first DFE stage further comprises a first feedback filter capable of receiving $\hat{S}_{k-d}$ and generating therefrom the first postcursor cancellation signal.

According to another embodiment of the present invention, the first DFE stage further comprises a first summer capable of adding the $Y'_k$ signal and the first postcursor cancellation signal to thereby generate the $v_k$ signal.

According to still another embodiment of the present invention, the first DFE stage further comprises a first symbol estimator capable of receiving the $v_k$ signal and generating the first decided symbol sequence, $\hat{S}_{k-d}$.

According to yet another embodiment of the present invention, the second DFE stage further comprises a delay circuit capable of receiving and delaying the $Y'_k$ signal and a second feedback filter capable of receiving $\hat{S}_{k-2d}$ and generating therefrom a second postcursor cancellation signal capable of reducing postcursor ISI in the delayed $Y'_k$ signal.

According to a further embodiment of the present invention, the second DFE stage further comprises a third feedback filter capable of receiving $S'_{k-d}$ and generating therefrom a precursor cancellation signal capable of reducing precursor ISI in the delayed $Y'_k$ signal.

According to a still further embodiment of the present invention, the second DFE stage further comprises a summer capable of adding the delayed $Y'_k$ signal, the precursor cancellation signal, and the second postcursor cancellation signal to thereby generate a second symbol estimate signal ($v'_k$) in which precursor ISI is at least partially reduced.

According to a yet further embodiment of the present invention, the second DFE stage further comprises a second symbol estimator capable of receiving the $v'_k$ signal and generating the second decided symbol sequence, $\hat{S}_{k-2d}$.

In another embodiment of the present invention, the soft symbol estimator generates a known symbol if a value of the $v_k$ signal exceeds a minimum threshold and generates a zero output signal if the value of the $v_k$ signal does not exceed the minimum threshold.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

Before undertaking the DETAILED DESCRIPTION, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION OF THE INVENTION

FIGS. 1 through 6, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged receiver.

Many wireline and wireless communication systems transmit a known sequence of symbols, called a training sequence, along with the unknown sequence of user data symbols in order to synchronize and adjust the receiver. The timing and values of the symbols in the training sequence are known by the receiver, thereby making the training sequence relatively easy to detect. An adaptive algorithm controller in the receiver analyzes the received training sequence, compares it to the known sequence, and uses the statistical properties of the received signal to adjust the values of the weighting coefficients in the forward filter and feedback filter of the DFE. When the unknown symbols are received, the DFE is better able to detect the correct values of the user data symbols. The present invention takes advantage of the transmission of known symbols to provide an improved receiver that at least partially reduces precursor ISI. The present invention also provides a dual decision feedback equalizer structure that at least partially reduces precursor ISI.

Figure 1A:
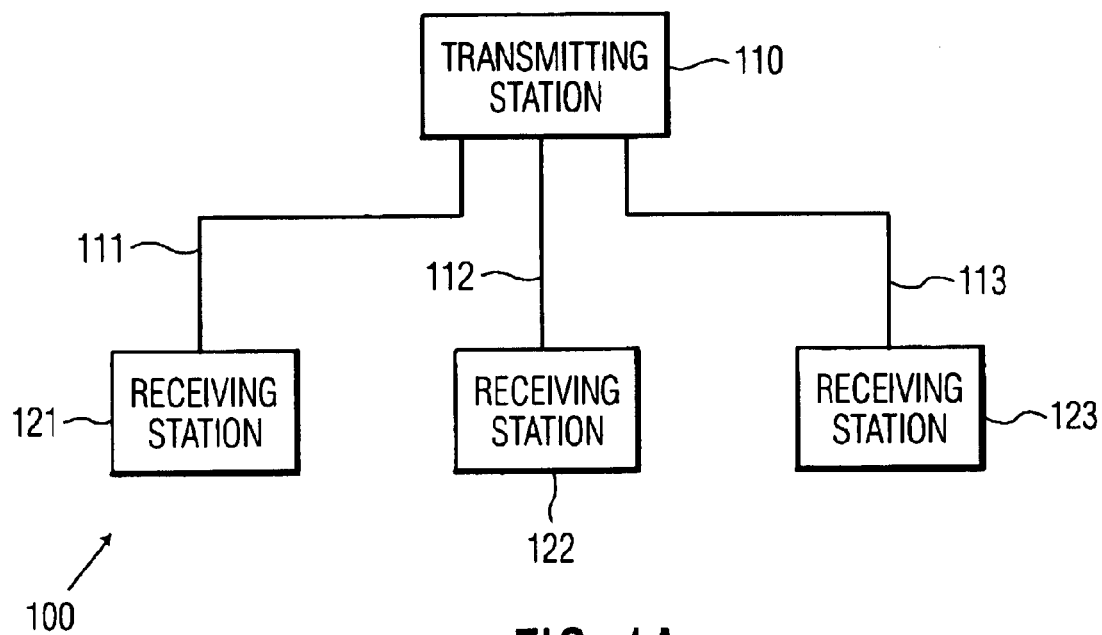
FIG. 1A illustrates an exemplary wireline network according to one embodiment of the present invention.

FIG. 1A illustrates exemplary wireline network 100 according to one embodiment of the present invention. Wireline network 100 comprises transmitting station 110 and receiving stations 121, 122 and 123. Transmitting station 110 communicates with receiving station 121–123 via wirelines 111, 112 and 113. The words "transmitting" and "receiving" with respect to transmitting station 110 and receiving stations 121–123 are exemplary only and should not be construed to limit the scope of the invention to one-way communication. In fact, in advantageous embodiments of the present invention, transmitting station 110 may comprise transceiver circuitry capable of transmitting data to, and receiving data from, receiving stations 121–123. Accordingly, in such embodiments, receiving station 121–123 also may comprise transceiver circuitry capable of transmitting data to, and receiving data from, transmitting station 110. Both transmitting station 110 and each of receiving stations 121–123 transmit data to a receiving device as mixture of known symbol sequences (e.g., training sequences) and unknown symbols (i.e., user data).

By way of example, in one embodiment of the present invention, transmitting station 110 may comprise a server in a local area network (LAN) or wide area network (WAN) that communicates bidirectionally with client nodes (i.e., receiving stations 121–123). In an alternate embodiment of the present invention, transmitting station 110 may comprise a cable television broadcast system that primarily transmit video signals to cable set-top boxes (i.e., receiving stations 121–123) in subscriber homes. However, transmitting station 110 may also receive upstream data traffic transmitted by the cable set-top boxes (STBs).

Figure 1B:
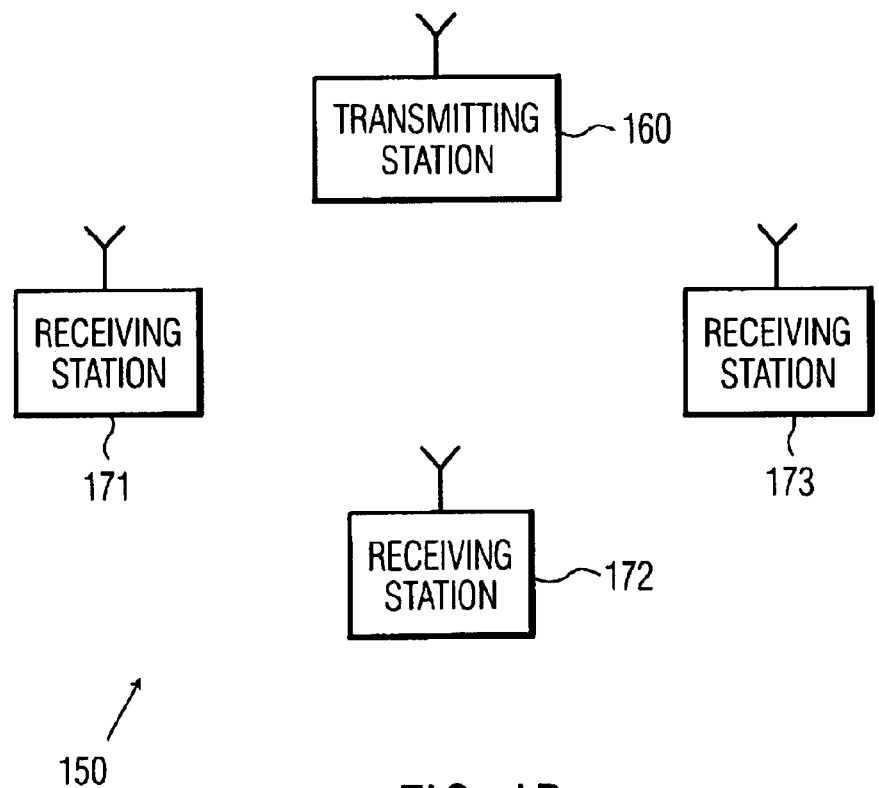
FIG. 1B illustrates an exemplary wireless network according to one embodiment of the present invention.

FIG. 1B illustrates exemplary wireless network 150 according to one embodiment of the present invention. Wireless network 150 comprises transmitting station 160 and receiving stations 171, 172 and 173. Transmitting station 160 communicates via the air interface with receiving station 171–173. Again, the words "transmitting" and "receiving" with respect to transmitting station 160 and receiving stations 171–173 are exemplary only and should not be construed to limit the scope of the invention to one-way wireless communication. In fact, in advantageous embodiments of the present invention, transmitting station 160 may comprise transceiver circuitry capable of wirelessly transmitting data to, and wirelessly receiving data from, receiving stations 171–173. Accordingly, in such embodiments, receiving station 171–173 also may comprise transceiver circuitry capable of wirelessly transmitting data to, and wirelessly receiving data from, transmitting station 160. Both transmitting station 160 and each of receiving stations 171–173 transmit data to a receiving device as mixture of known symbol sequences (e.g., training sequences) and unknown symbols (i.e., user data).

By way of example, in one embodiment of the present invention, transmitting station 160 may comprise a server in a wireless LAN or WAN that communicates bidirectionally with client nodes (i.e., receiving stations 171–173). In an alternate embodiment of the present invention, transmitting station 160 may comprise a base transceiver station in a cellular network that transmits voice and data traffic to mobile stations (i.e., receiving stations 171–173) and receive voice and data traffic from the mobile stations (e.g., cell phones). In still another embodiment of the present invention, transmitting station 160 may comprise a high definition television (HDTV) broadcast facility that transmits high definition video signals to HDTV receivers (i.e., receiving stations 171–173) in its local coverage area.

In both wireline network 100 and wireless network 150, each transmitted data symbol arrives at the receiving device distorted by postcursor and precursor intersymbol interference (ISI) caused by the band-width limited transmission channel and or reflections off objects. To minimize the effects of ISI, receiving stations 121–123 and receiving stations 171–173 comprise adaptive decision feedback equalizers (DFEs) capable of reducing both postcursor ISI and precursor ISI in accordance with the principles of the present invention. Furthermore, in bidirectional communication networks, transmitting stations 110 and 160 also may comprise adaptive DFEs capable of reducing both postcursor ISI and precursor ISI in signals transmitted by receiving stations 121–123 and receiving stations 171–173.

Figure 2:
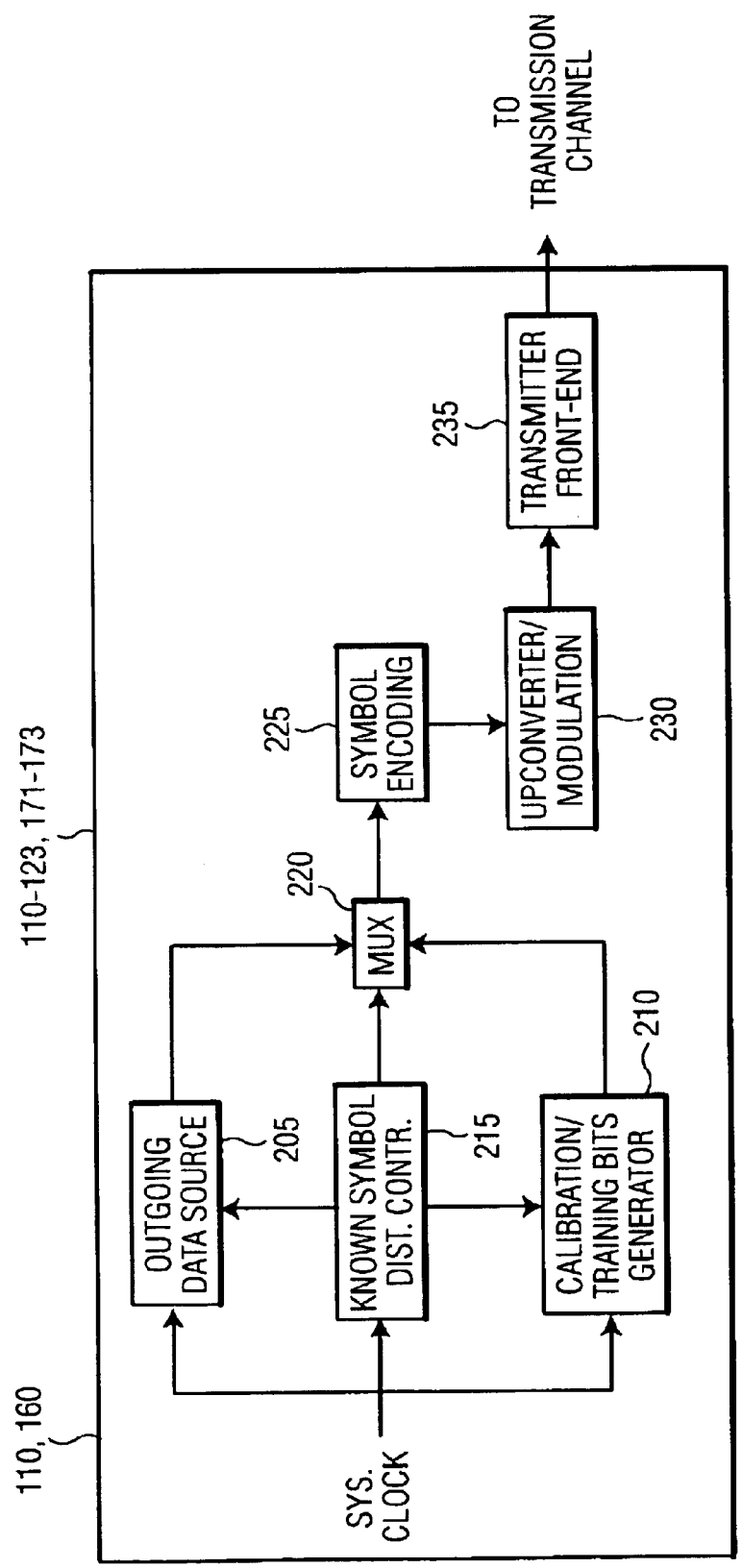
FIG. 2 illustrates selected portions of exemplary transmitter circuitry disposed in the transmitting stations and, for two-way systems, the receiving stations in FIGS. 1A and 1B.

FIG. 2 illustrates selected portions of exemplary transmitter circuitry disposed in transmitting stations 110 and 160 and, for two-way systems, receiving stations 121–123 and 171–173. The exemplary transmitter circuitry comprises outgoing data source 205, calibration/training bits generator 210, known symbol distribution controller 215, multiplexer 220, symbol encoding circuitry 225, up-converter/modulation circuitry 230, and transmitter front-end circuitry 235. Outgoing data source 205 generates the user data that is to be transmitted to a receiving device. For example, outgoing data source 205 may be a cell phone vocoder that converts an analog voice signal to digital data to be transmitted to a base transceiver station. Alternatively, outgoing data source 205 may be an application executed on a server that transmits data to a client work station via a wireline LAN.

The user data generated by outgoing data source 205 are unknown data bits that are combined with known data bits generated by calibration/training bits generator 210. Calibration/training bits generator 210 may generated a training sequence that precedes the unknown user data. Calibration/training bits generator 210 also may generate additional training sequences that are distributed among the unknown data as a single block or in a plurality of smaller blocks at known intervals or locations among the unknown user data. For example, in a GSM mobile phone network, a GSM data packet comprises 148 bits, including 116 user data bits. The GSM data packet also comprises 3 start bits at the start of the user data, a 26-bit training sequence in the middle of the user data bits, and 3 stop bits at the end of the user data bits.

The size and location of the training/calibration sequences of known data bits are controlled by known symbol distribution controller 215, which selectively switches the source of data that is output by multiplexer (MUX) 220. Thus, the output of MUX 220 is a stream of known calibration/training bits interspersed at known locations among unknown user data bits. In an advantageous embodiment of the present invention, known symbol distribution controller 215 is an adaptive device that is capable of modifying the size and location of groups of calibration/training bits according to the known characteristics of the receiver. More particularly, known symbol distribution controller 215 is capable of modifying the size and location of groups of calibration/training bits in order to maximize the performance of the improved precursor ISI cancellation decision feedback equalizer (DFE) in the receiving device.

Symbol encoding circuitry 225 encodes the data bits according to any known symbol encoding scheme. Thus, a Logic 1 bit received from multiplexer 225 may be encoded as a first unique sequence of pulses and a Logic 0 bit received from multiplexer 225 may be encoded as a second unique sequence of pulses. Thus, the output of symbol encoding circuitry 225 is the sequence of known and unknown symbols that must be detected by the receiver DFE.

Up-converter/modulation circuitry 230 converts the baseband sequence of known and unknown symbols to a modulated (up-converted) signal capable of being transmitted through the transmission channel (wireline or wireless). For example, in a wireless network, up-converter/modulation circuitry 230 may comprise an RF mixer that converts the baseband sequence to a modulated radio frequency (RF) signal capable of being transmitted through the air channel to a receiving device. Finally, transmitter front-end circuitry comprises RF amplifiers, duplexer circuitry, and antennas that transmit the output of up-converter/modulation circuitry 230 into the corresponding wireline or wireless channel.

The arrangement and interconnection of known symbol distribution controller 215, calibration/training bits generator 210, and symbol encoding circuitry 225 is exemplary only. Those skilled in the art will recognize there are numerous other circuit arrangements capable of inserting known symbols at known locations in a sequence of outgoing unknown symbols. The arrangement in FIG. 2 is suitable for those applications in which a symbol is used to represent no more than one data bit. This ensures that a known bit from calibration/training bits generator 210 is encoded only as a known symbol and that an unknown bit from outgoing data source 205 is encoded only as an unknown symbol.

However, in other systems, a single symbol may be used to represent more than one data bit. For example, four different symbols may be used to represent the bit pairs 00, 01, 10, 11. In such a system, precautions must be taken to ensure that symbol encoding circuitry 225 does not encode a known bit and an unknown data bit as a single symbol. To accomplish this, known symbol distribution controller 215 and calibration/training bits generator 210 may be coupled directly to symbol encoding circuitry 225, and multiplexer 220 may be omitted. In such a circuit arrangement, symbol encoding circuitry 225 would encode all unknown data bit pairs from outgoing data source 205 as a sequence of unknown symbols and known symbol distribution controller 215 would cause symbol encoding circuitry 225 to insert known symbols representing known data bit pairs into the outgoing sequence of be unknown symbols.

Figure 3:
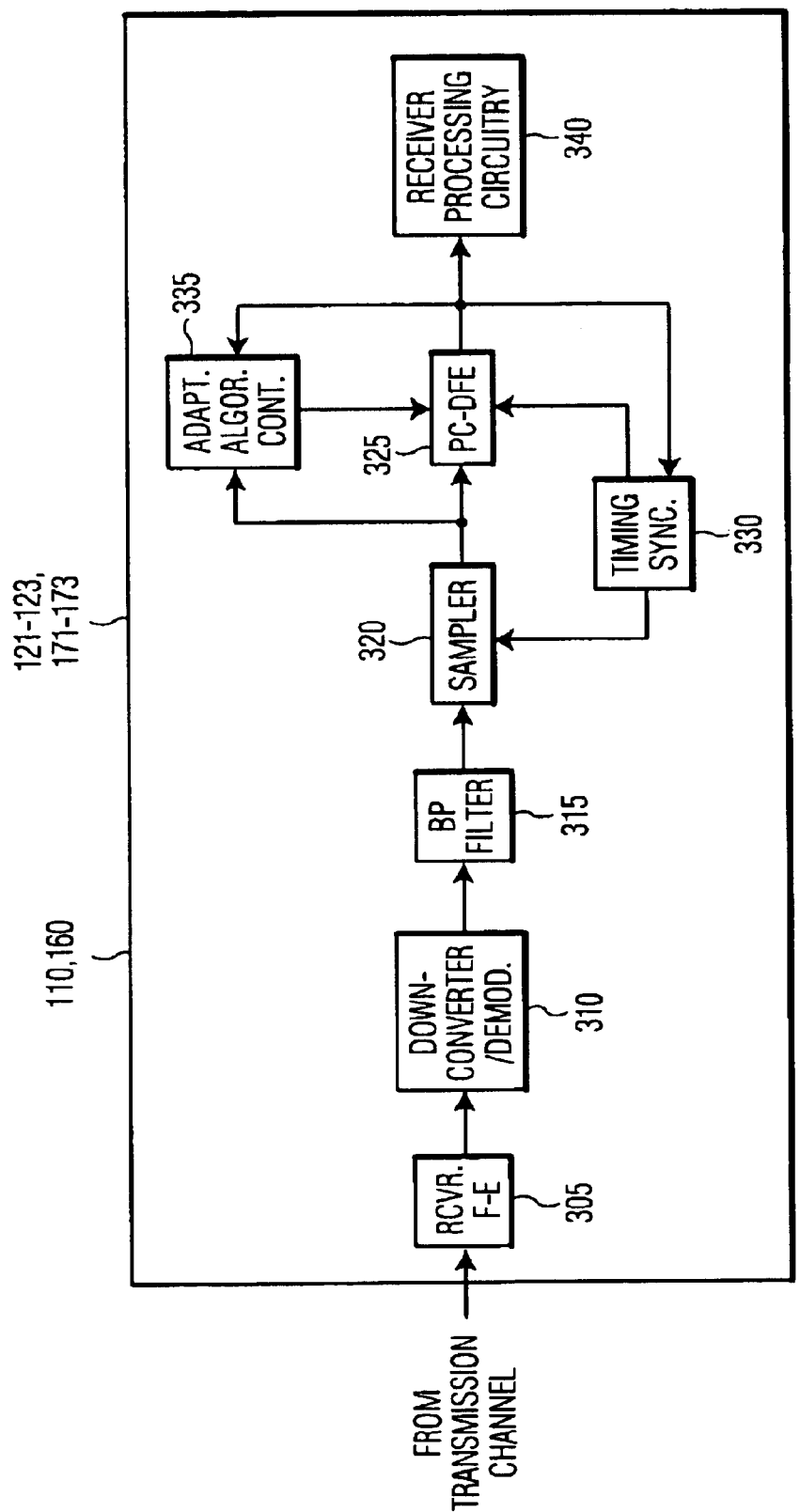
FIG. 3 illustrates selected portions of exemplary receiver circuitry disposed in the receiving stations and, for two-way systems, the transmitting stations in FIGS. 1A and 1B.

FIG. 3 illustrates selected portions of exemplary receiver circuitry disposed in receiving stations 121–123 and 171–173 and, for two-way systems, transmitting stations 110 and 160. The exemplary receiver circuitry comprises receiver front-end (F-E) circuitry 305, down-converter/demodulation circuitry 310, bandpass (BP) filter 315, sampler circuitry 320, precursor decision feedback equalizer (PC-DFE) 325, timing synchronization circuitry 330, adaptive algorithm controller 335, and receiver processing circuitry 340. Receiver front-end circuitry 305 typically comprises a low noise amplifier and filters that receive the transmitted known and unknown symbols from the wireline or wireless channels and amplify and isolate the frequencies of interest (i.e., receive band).

Down-converter/demodulation circuitry 310 demodulates (down-converts) the incoming modulated signals to produce an analog baseband signal comprising a sequence of known and unknown symbols that are distorted to postcursor and precursor ISI. Sampler circuitry 320 converts the analog baseband signal to a digital baseband signal. The digital baseband signal is filtered by PC-DFE 325 to minimize the postcursor and precursor ISI distortion. Ideally, the output of PC-DFE 325 is the original sequence of known and unknown symbols.

Timing synchronization circuit 330 receives the output of PC-DFE 325 and uses it to synchronize (align) the analog-to-digital converter in sampler circuitry 320 and to synchronize the filtering circuitry in PC-DFE 325, as described below in greater detail. Adaptive algorithm controller 335 also receives the output of PC-DFE 325 and compares it to the input sequence of distorted symbols from sampler circuitry 320. From this comparison, adaptive algorithm controller 335 can determine and modify the weighting coefficients in the forward filter section and the feedback filter section of PC-DFE 325 in order to minimize ISI distortion. Finally, receiver processing circuitry 340 converts the sequence of known (i.e., calibrations/training) symbols and unknown symbols back to data bits and extracts the user data bits according to the algorithm used by known symbol distribution controller 215.

Figure 4:
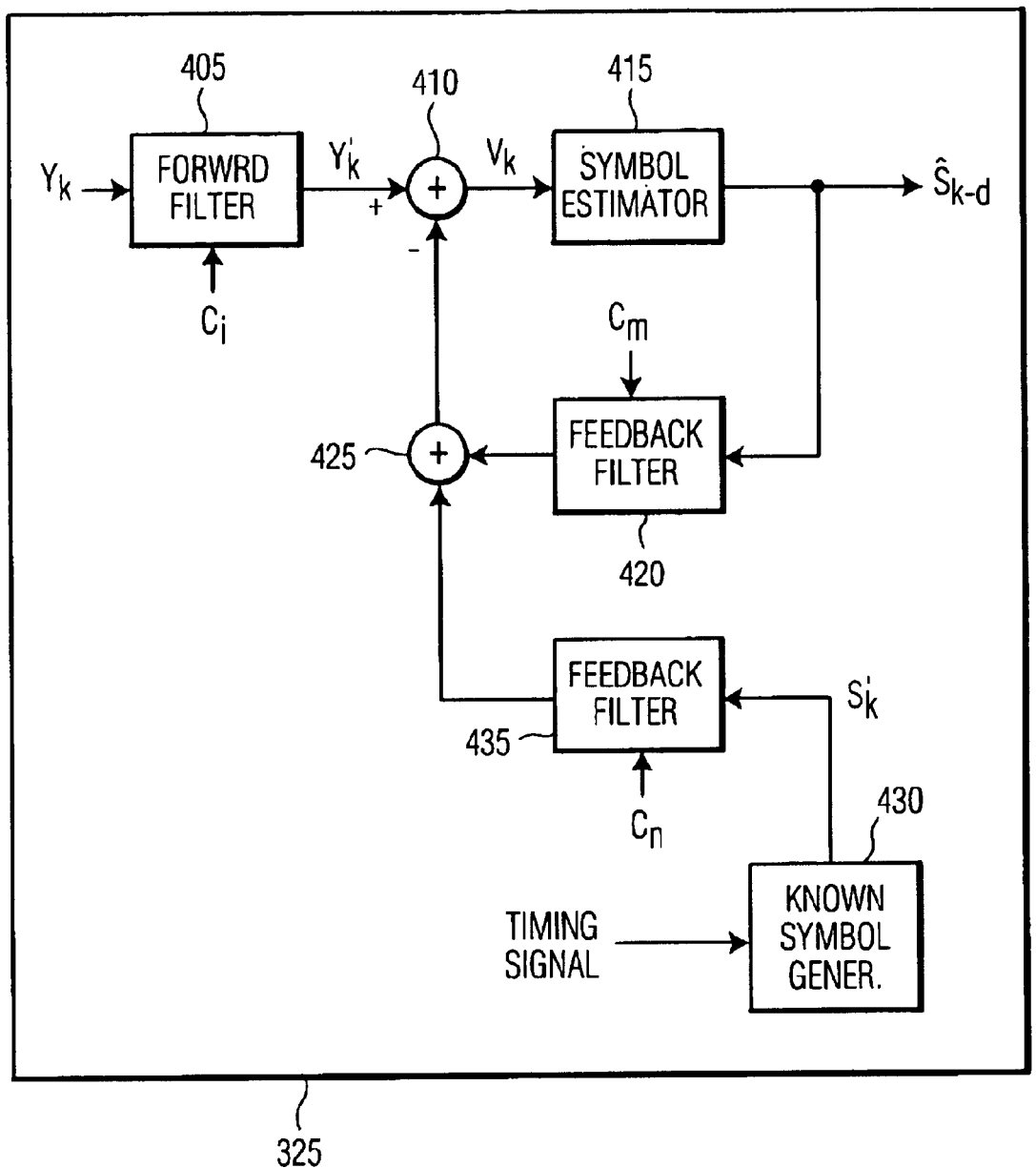
FIG. 4 illustrates an exemplary precursor cancellation decision feedback equalizer in the exemplary receiver according to one embodiment of the present invention.

FIG. 4 illustrates exemplary precursor cancellation decision feedback filter (PC-DFE) 325 in greater detail according to one embodiment of the present invention. PC-DFE 325 comprises forward filter 405, summer 410, symbol estimator 415, feedback filter 420, summer 425, feedback filter 435 and known symbol generator 430 according to one embodiment of the present invention. Those skilled in the art will recognize that forward filter 405, summer 410, symbol estimator 415, and feedback filter 420 constitute a conventional decision feedback filter capable of reducing postcursor ISI from previously estimated (or decided) symbols. The present invention differs from a conventional decision feedback filter due to the addition of summer 425, feedback filter 435, and known symbol generator 430.

As noted above, adaptive algorithm controller 335 determines the values of the weighting coefficients, Ci, of forward filter 405, the weighting coefficients, Cm, of feedback filter 420, and the weighting coefficients, Cn, of feedback filter 435. Adaptive algorithm controller 335 estimates the channel impulse response during receipt of the known training symbols and during receipt of other known symbols, such as known synchronization symbols and known packet identification symbols. If a training sequence is used, forward filter 405, feedback filter 420 and feedback filter 435 may be adaptively adjusted using the recursive least square (RLS) algorithm or the least mean square (LMS) algorithm.

Forward filter 405 receives the sequence of ISI-distorted symbols, $Y_k$, from sampler circuit 320 and produces an equalized output, $Y'_k$, that is an estimate of the input sequence. Adder 410 add the $Y'_k$ output to a composite (precursor and postcursor) ISI correction signal (explained below in greater detail) from summer 425 to produce the symbol estimate, $v_k$. Symbol estimator 415 quantizes the $v_k$ symbol estimate to the nearest symbol value to form a sequence of decided (i.e., detected) symbols, $\hat{S}_{k-d}$, that is transmitted to timing synchronization circuitry 330, adaptive algorithm controller 335, and receiver processing circuitry 340. The quantity k is the index of the current symbol and d is the decision (detection) delay associated with symbol estimator 415. The decided symbol sequence also is transmitted back to feedback filter 420, which removes that part of the intersymbol interference from the present estimate caused by previously detected symbols (i.e., post-cursor ISI).

Known symbol generator 430 receives a timing signal from timing synchronization circuitry 330 and transmits a sequence of known symbols, $S'_k$, through feedback filter 435 at the proper location in the sequence of known and unknown symbols that are being processed by symbol estimator 415. In an advantageous embodiment of the present invention, feedback filter 435 is a $L_2$-tap transversal filter chosen to minimize precursor ISI from the known symbols. The output of known symbol generator 430 is normally zero. However, known symbol generator 430 generates known symbols during the time periods when one or more preceding unknown symbols are being estimated by symbol estimator 415. In this manner, the effect of the precursor ISI of the known symbol can be removed from the present estimate, even though the known symbol has not been detected yet.

For example, if the sixth symbol in a sequence is known, known symbol generator 430 can output the sixth symbol during the estimation of the unknown fourth symbol and the unknown fifth symbol. The precursor ISI of the sixth symbol can therefore be removed from, for example, the fifth symbol estimate, just as feedback filter 420 removes from the fifth symbol estimate the postcursor ISI of the fourth symbol.

Figure 5:
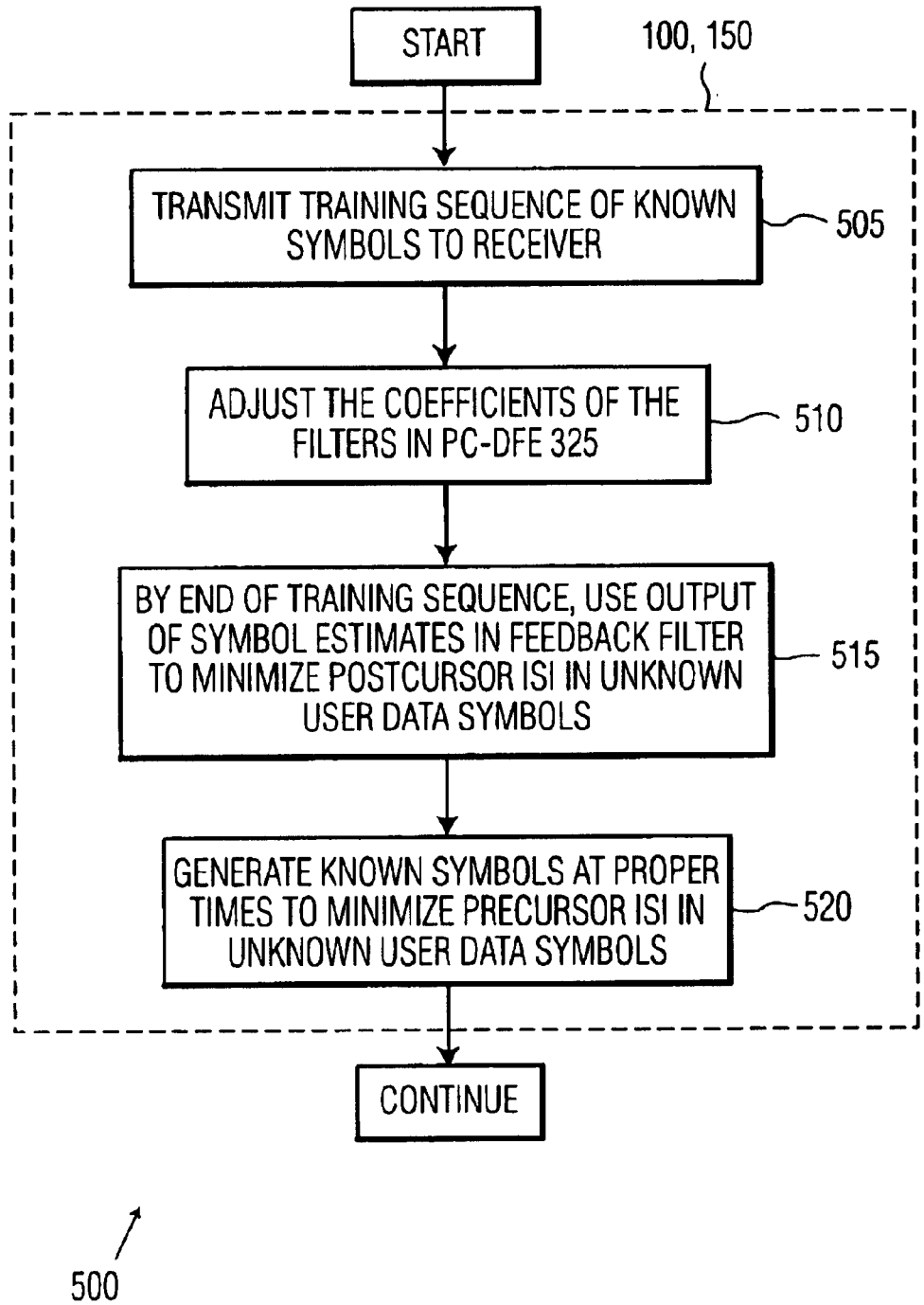
FIG. 5 is a flow diagram illustrating the operation of the transmitters and receivers in the exemplary wireline and wireless networks according to one embodiment of the present invention.

FIG. 5 depicts flow diagram 500, which illustrates the operation of exemplary transmitting stations 110 and 150 and exemplary receiving stations 121–123 and 171–173 in wireline network 100 and wireless network 150 according to one embodiment of the present invention. Transmission of user data begins when, for example, transmitting station 110 transmits a training sequence of known symbols to receiving station 121 (process step 505). Next, adaptive algorithm controller 335 in receiving station 121 adjusts the coefficients of the filters in PC-DFE 325 to achieve, for example, minimum mean square error (process step 510). By the end of the training sequence, PC-DFE 325 uses the output of symbol estimator 415 in feedback filter 420 to minimize postcursor ISI in subsequent unknown user data symbols (process step 515). At the same time, PC-DFE 325 uses the output of known symbol generator 430 in feedback filter 435 to minimize precursor ISI in subsequent unknown user data symbols (process step 520).

Figure 6:
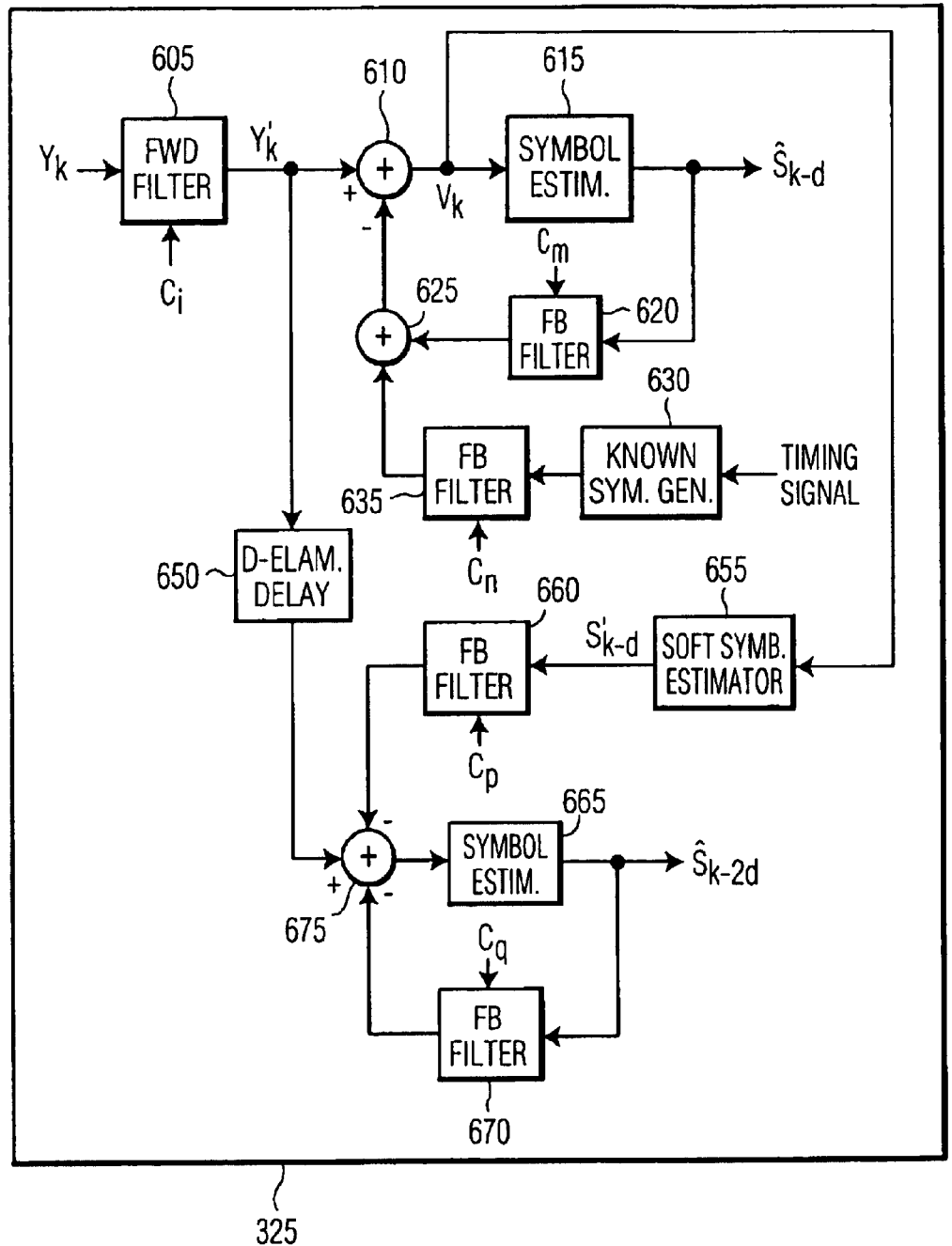
FIG. 6 illustrates an exemplary precursor cancellation dual decision feedback equalizer according to an alternate embodiment of the present invention.

FIG. 6 illustrates an alternate embodiment of a precursor cancellation decision feedback equalizer that uses dual decision feedback equalizers to perform precursor cancellation. PC-DFE 325 comprises forward (FWD) filter 605, summer 610, symbol estimator 615, feedback (FB) filter 620, summer 625, feedback filter 635, and known symbol generator 630. It should be noted that forward filter 605, summer 610, symbol estimator 615, feedback filter 620, summer 625, feedback filter 635, and known symbol generator 630 comprise a first DFE stage that is nearly identical to PC-DFE 325 in FIG. 4. However, the embodiment of the precursor cancellation decision feedback equalizer illustrated in FIG. 6 differs from the FIG. 4 embodiment in the addition of a second DFE stage, comprising D-element delay circuit 650, soft symbol estimator 655, feedback filter 660, symbol estimator 665, feedback filter 670 and summer 675, that performs precursor cancellation. Advantageously, the first DFE stage and the second DFE stage share forward filter 605, thereby reducing computation complexity and simplifying the circuit design.

As before, adaptive algorithm controller 335 determines the values of the weighting coefficients, Ci, of forward filter 605, the weighting coefficients, Cm, of feedback filter 620, and the weighting coefficients, Cn, of feedback filter 635. Adaptive algorithm controller 335 also determines the values of the weighting coefficients, Cp, of feedback filter 660, and the weighting coefficients, Cq, of feedback filter 670.

Forward filter 605 receives the sequence of ISI-distorted symbols, $Y_k$, from sampler circuit 320 and produces an equalized output, $Y'_k$, that is an estimate of the input sequence. Summer 610 adds the $Y'_k$ output to a composite (precursor and postcursor) ISI correction signal from summer 625 to produce the symbol estimate, $v_k$. Symbol estimator 615 quantizes the $v_k$ symbol estimate to the nearest symbol value to form a sequence of decided (i.e., detected) symbols, $\hat{S}_{k-d}$. The decided symbol sequence is transmitted back to feedback filter 620, which removes that part of the intersymbol interference from the present estimate caused by previously detected symbols (i.e., post-cursor ISI).

It is important to note that symbol estimator 615 is a "hard" decision device. That is, all input signal levels at $v_k$ are decided to be either +1 or −1. If $v_k$ is +0.2 or +0.9, both be positive number are converted to +1. Similarly, if $v_k$ is −0.1 or −0.8, both levels are converted to −1. As will be explained below in greater detail, this is different than "soft" symbol estimator 655, which also has a 0 output level for values of $v_k$ that are below a certain sensitivity threshold.

Known symbol generator 630 receives a timing signal from timing synchronization circuitry 330 and transmits a sequence of known symbols, $S'_k$, through feedback filter 635 at the proper location in the sequence of known and unknown symbols that are being processed by symbol estimator 615. The output of known symbol generator 630 is normally zero. However, known symbol generator 630 generates known symbols during the time periods when one or more preceding unknown symbols are being estimated by symbol estimator 615. In this manner, the effect of the precursor ISI of the known symbol can be removed from the present estimate, even though the known symbol has not been detected yet.

The equalized output, $Y'_k$, of forward filter 605 is also provided to D-element delay circuit 650, which delays the signal by d, the decision delay of soft symbol estimator 655. Symbol estimator 655 quantizes the $v_k$ symbol estimate to the nearest symbol value if the $v_k$ symbol estimate exceeds a system-defined threshold value (i.e., a known symbol) or outputs a 0.0 signal level if the $v_k$ symbol estimate does not exceed the threshold value (i.e., an unknown symbol).

For example, assume that the positive threshold for a +1 is set to +0.5. If $v_k$ is +0.2, then the output of soft symbol estimator 655 is 0.0 because $v_k$ does not exceed the +1 threshold. If $v_k$ is +0.9, then the output of soft symbol estimator 655 is +1 because $v_k$ exceeds the +1 threshold. Similarly, assume that the negative threshold for a −1 is set to −0.5. If $v_k$ is −0.2, then the output of soft symbol estimator 655 is 0.0 because $v_k$ does not exceed the −1 threshold. If $v_k$ is −0.8, then the output of soft symbol estimator 655 is −1 because $v_k$ exceeds the −1 threshold. Thus, the output of soft symbol estimator 655 forms a sequence of known (decided) symbols and unknown (undecided) symbols, $S'_{k-d}$. The known symbols have +1 and −1 signal levels and the unknown symbols have 0.0 signal levels.

Feedback filter 660 filters the output of soft symbol estimator 655 to produce a precursor ISI correction signal that is a filtered sequence of decided and undecided symbols applied to one input of summer 675. The time delayed equalized output, $Y'_k$, forms another input to summer 675. Summer 675 adds the delayed $Y'_k$ output to the postcursor ISI correction signal from feedback filter 670 and the precursor correction signal from feedback filter 660. The output of summer 675 is the new symbol estimate, $v'_k$ at the input to symbol estimator 665.

Symbol estimator 665 quantizes the $v'_k$ symbol estimate to the nearest symbol value to form a sequence of decided (i.e., detected) symbols, $\hat{S}_{k-2d}$. The decided symbol sequence is transmitted back to feedback filter 670, which removes that part of the intersymbol interference from the present estimate caused by previously detected symbols (i.e., post-cursor ISI). The output of symbol estimator 665 is transmitted to timing synchronization circuitry 330, adaptive algorithm controller 335, and receiver processing circuitry 340.

It should be noted that the first DFE stage, namely forward filter 605, summer 610, symbol estimator 615, feedback filter 620, summer 625, feedback filter 635, and known symbol generator 630 is not required to be a precursor cancellation DFE. Instead, a conventional DFE could be used to generate the $v_k$ symbol estimate that is applied to the input of soft symbol estimator 655. The output of soft symbol estimator 655 serves the same function as the output of known symbol generator 630.

It is recalled that known symbol generator 630 outputs a +1 or −1 when an incoming symbol is known in the input sequence (i.e., training or calibration symbol) and outputs a 0 signal level if the output is unknown. Similarly, soft symbol estimator 655 outputs a +1 or −1 when an incoming symbol is known (i.e., it is strong enough to exceed the +1 threshold or the −1 threshold) and outputs a 0 signal level if the output is unknown (i.e., it is not strong enough to exceed the +1 threshold or the −1 threshold). This is done to minimize propagation error.

Assuming correct symbol detection, the optimum choice for feedback filter 670 for mean square error minimization is to have the coefficients $b_i = q_{i+d}$ for $i=1, 2, \ldots, L_b$, where $L_b$ is the length of feedback filter 670, and $q_i = f_i * h_i$, where $h_i$ is the finite impulse response (FIR) channel impulse response, $f_i$ is forward filter 605, and * is the operation of convolution. The optimum choice for feedback filter 660 is $b'_i = q_i$, for $i=0, 1, 2, \ldots, d-1$.

Although the present invention has been described in detail, those skilled in the art should understand that they can make various changes, substitutions and alterations herein without departing from the spirit and scope of the invention in its broadest form.

What is claimed is:

1. For use in a receiver capable of receiving from a transmission channel an incoming stream of symbols distorted by intersymbol interference (ISI), an apparatus for reducing a precursor ISI signal comprising:
   a first forward filter capable of receiving said incoming stream of distorted symbols and generating a first equalized output signal ($Y'_k$);
   a first decision feedback equalizer (DFE) stage capable of receiving said $Y'_k$ signal and generating a first decided symbol sequence ($\hat{S}_{k-d}$), wherein said first DFE stage generates from $\hat{S}_{k-d}$ a first postcursor cancellation signal capable of reducing postcursor ISI in said $Y'_k$ signal and generates from said $Y'_k$ signal a first symbol estimate signal ($v_k$) in which postcursor ISI is at least partially reduced; and
   a second decision feedback equalizer (DFE) stage capable of receiving said $Y'_k$ signal and generating a second decided symbol sequence ($\hat{S}_{k-2d}$), wherein said second DFE stage comprises a soft symbol estimator capable of receiving said $v_k$ signal and generating a soft decision sequence ($S_{k-d}$) comprising decided symbols and zero output signals, and wherein said second DFE stage generates from $S'_{k-d}$ a precursor cancellation signal capable of reducing precursor ISI in said $Y'_k$ signal.

2. The apparatus as set forth in claim 1 wherein said first DFE stage further comprises a first feedback filter capable of receiving $\hat{S}_{k-d}$ and generating therefrom said first postcursor cancellation signal.

3. The apparatus as set forth in claim 2 wherein said first DFE stage further comprises a first summer capable of adding said $Y'_k$ signal and said first postcursor cancellation signal to thereby generate said $v_k$ signal.

4. The apparatus as set forth in claim 3 wherein said first DFE stage further comprises a first symbol estimator capable of receiving said $v_k$ signal and generating said first decided symbol sequence, $\hat{S}_{k-d}$.

5. The apparatus as set forth in claim 4 wherein said second DFE stage further comprises a delay circuit capable of receiving and delaying said $Y'_k$ signal and a second feedback filter capable of receiving $\hat{S}_{k-2d}$ and generating therefrom a second postcursor cancellation signal capable of reducing postcursor ISI in said delayed $Y'_k$ signal.

6. The apparatus as set forth in claim 5 wherein said second DFE stage further comprises a third feedback filter capable of receiving $S'_{k-d}$ and generating therefrom a precursor cancellation signal capable of reducing precursor ISI in said delayed $Y'_k$ signal.

7. The apparatus as set forth in claim 6 wherein said second DFE stage further comprises a summer capable of adding said delayed $Y'_k$ signal, said precursor cancellation signal, and said second postcursor cancellation signal to thereby generate a second symbol estimate signal ($v'_k$) in which precursor ISI is at least partially reduced.

8. The apparatus as set forth in claim 7 wherein said second DFE stage further comprises a second symbol estimator capable of receiving said $v'_k$ signal and generating said second decided symbol sequence, $\hat{S}_{k-2d}$.

9. The apparatus as set forth in claim 8 wherein said soft symbol estimator generates a decided symbol if a value of said $v_k$ signal exceeds a minimum threshold and generates a zero output signal if said value of said $v_k$ signal does not exceed said minimum threshold.

10. A receiver capable of minimizing precursor intersymbol interference (ISI) in an incoming stream of symbols distorted by intersymbol interference (ISI) in a transmission channel, said receiver comprising:
   receiver front-end circuitry capable of receiving and amplifying an incoming modulated signal;
   demodulation circuitry capable of receiving said amplified incoming modulated signal and producing therefrom a baseband signal comprising said incoming stream of distorted symbols; and
   an apparatus for reducing a precursor ISI signal comprising:
   a first forward filter capable of receiving said incoming stream of distorted symbols and generating a first equalized output signal ($Y'_k$);
   a first decision feedback equalizer (DFE) stage capable of receiving said $Y'_k$ signal and generating a first decided symbol sequence ($\hat{S}_{k-d}$), wherein said first DFE stage generates from $\hat{S}_{k-d}$ a first postcursor cancellation signal capable of reducing postcursor ISI in said $Y'_k$ signal and generates from said $Y'_k$ signal a first symbol estimate signal ($v_k$) in which postcursor ISI is at least partially reduced; and a second decision feedback equalizer (DFE) stage capable of receiving said Y'$_k$ signal and generating a second decided symbol sequence ($\hat{S}_{k-2d}$), wherein said second DFE stage comprises a soft symbol estimator capable of receiving said v$_k$ signal and generating a soft decision sequence (S'$_{k-d}$) comprising decided symbols and zero output signals, and wherein said second DFE stage generates from S'$_{k-d}$ a precursor cancellation signal capable of reducing precursor ISI in said Y'$_k$ signal.

11. The receiver as set forth in claim 10 wherein said first DFE stage further comprises a first feedback filter capable of receiving $\hat{S}_{k-d}$ and generating therefrom said first postcursor cancellation signal.

12. The receiver as set forth in claim 11 wherein said first DFE stage further comprises a first summer capable of adding said Y'$_k$ signal and said first postcursor cancellation signal to thereby generate said v$_k$ signal.

13. The receiver as set forth in claim 12 wherein said first DFE stage further comprises a first symbol estimator capable of receiving said v$_k$ signal and generating said first decided symbol sequence, $\hat{S}_{k-d}$.

14. The receiver as set forth in claim 13 wherein said second DFE stage further comprises a delay circuit capable of receiving and delaying said Y'$_k$ signal and a second feedback filter capable of receiving $\hat{S}_{k-2d}$ and generating therefrom a second postcursor cancellation signal capable of reducing postcursor ISI in said delayed Y'$_k$ signal.

15. The receiver as set forth in claim 14 wherein said second DFE stage further comprises a third feedback filter capable of receiving S'$_{k-d}$ and generating therefrom a precursor cancellation signal capable of reducing precursor ISI in said delayed Y'$_k$ signal.

16. The receiver as set forth in claim 15 wherein said second DFE stage further comprises a summer capable of adding said delayed Y'$_k$ signal, said precursor cancellation signal, and said second postcursor cancellation signal to thereby generate a second symbol estimate signal (v'$_k$) in which precursor ISI is at least partially reduced.

17. The receiver as set forth in claim 16 wherein said second DFE stage further comprises a second symbol estimator capable of receiving said v'$_k$ signal and generating said second decided symbol sequence, $\hat{S}_{k-2d}$.

18. The receiver as set forth in claim 17 wherein said soft symbol estimator generates a decided symbol if a value of said v$_k$ signal exceeds a minimum threshold and generates a zero output signal if said value of said v$_k$ signal does not exceed said minimum threshold.

19. For use in a receiver capable of receiving from a transmission channel an incoming stream of symbols distorted by intersymbol interference (ISI), a method of reducing a precursor ISI signal comprising the steps of:

receiving the incoming stream of distorted symbols in a first forward filter and generating a first equalized output signal (Y'$_k$);

receiving the Y'$_k$ signal in a first decision feedback equalizer (DFE) stage and generating a first decided symbol sequence ($\hat{S}_{k-d}$);

in the first DFE stage, generating from $\hat{S}_{k-d}$ a first postcursor cancellation signal capable of reducing postcursor ISI in the Y'$_k$ signal and generating from the Y'$_k$ signal a first symbol estimate signal (v$_k$) in which postcursor ISI is at least partially reduced; and receiving the Y'$_k$ signal in a second decision feedback equalizer (DFE) stage and generating a second decided symbol sequence ($\hat{S}_{k-2d}$);

in the second DFE stage, receiving the v$_k$ signal and generating a soft decision sequence (S'$_{k-d}$) comprising decided symbols and zero output signals; and in the second DFE stage generating from S'$_{k-d}$ a precursor cancellation signal capable of reducing precursor ISI in the Y'$_k$ signal.

20. The method as set forth in claim 19 further comprising the step of delaying the Y'$_k$ signal in the second DFE stage.

21. The method as set forth in claim 19 wherein the step of generating the soft decision sequence, S$_{k-d}$, comprises the sub-steps of generating a decided symbol if a value of the v$_k$ signal exceeds a minimum threshold and generating a zero output signal if the value of the v$_k$ signal does not exceed the minimum threshold.

* * * * *